US008401789B2

(12) United States Patent
Natsume

(10) Patent No.: US 8,401,789 B2
(45) Date of Patent: Mar. 19, 2013

(54) NAVIGATION SYSTEM, ROUTE RETRIEVAL SERVER AND MOBILE TERMINAL DEVICE, AND ROUTE GUIDING METHOD

(75) Inventor: Yoshifumi Natsume, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 635 days.

(21) Appl. No.: 12/601,146

(22) PCT Filed: May 23, 2007

(86) PCT No.: PCT/JP2007/060494

§ 371 (c)(1), (2), (4) Date: Nov. 20, 2009

(87) PCT Pub. No.: WO2008/142783

PCT Pub. Date: Nov. 27, 2008

(65) Prior Publication Data

US 2010/0153004 A1 Jun. 17, 2010

(51) Int. Cl.
*G01C 21/00* (2006.01)

(52) U.S. Cl. .......................................... 701/527; 104/18

(58) Field of Classification Search ......... 701/FOR. 108, 701/400, 408–414, 465, 424, 426, 428, 527; 340/988, 992, 994, 995.24, 995.19; 705/6; 104/18, 20, 27, 28, 30

See application file for complete search history.

(56) References Cited

U.S. PATENT DOCUMENTS

| | | | | |
|---|---|---|---|---|
| 7,023,808 | B2 * | 4/2006 | Ball et al. | 370/238 |
| 7,640,268 | B2 * | 12/2009 | Gotoh et al. | 701/532 |

FOREIGN PATENT DOCUMENTS

| | | | |
|---|---|---|---|
| JP | 08-077494 A | | 3/1996 |
| JP | 2001-165681 A | | 6/2001 |
| JP | 2001-337967 A | | 12/2001 |
| JP | 2006-293443 A | | 10/2006 |
| JP | 2006-301735 A | | 11/2006 |
| JP | 2007-114030 A | | 5/2007 |

OTHER PUBLICATIONS

Notification of Transmittal of Translation of the International Preliminary Report on Patentability (Form PCT/IB/338) of International Application No. PCT/JP2007/060494 mailed Jan. 21, 2010 with Forms PCT/IB/373, PCT/ISA/237 and PCT/IB/326.

International Search Report of PCT/JP2007/060494, mailing date of Aug. 21, 2007.

* cited by examiner

*Primary Examiner* — Dalena Tran

(74) *Attorney, Agent, or Firm* — Westerman, Hattori, Daniels & Adrian, LLP

(57) ABSTRACT

A mobile terminal device has a display for indicating guidance of a route retrieved by a route retriever and a GPS receiver for detecting the present location. A route retrieval server has a database for storing the present location of each bus running on bus lines and an alternative route guider for evaluating alternative bus route to provide guidance. When the guided route includes a walking route, the route retriever references the database based on the present location of the mobile terminal device to identify an alternative route that includes a bus. The alternative route guider compares the alternative route and guided route. When the alternative route is more favorable than the guided route, the alternative route guider sends alternative route information indicating presence of the alternative route to the mobile terminal device, displays the guided route on a display, and indicates the presence of the alternative route.

14 Claims, 9 Drawing Sheets

NAVIGATION SYSTEM, ROUTE RETRIEVAL SERVER AND MOBILE TERMINAL DEVICE, AND ROUTE GUIDING METHOD

TECHNICAL FIELD

The present invention relates to a navigation system for searching and providing guidance for a plurality of candidate routes and an optimal route in a combination of walking routes and trains and other transportation facilities, and more particularly relates to a navigation system, a route search server, a mobile terminal device, and a route guidance method in which notification is provided in the case that there is a route that uses a bus that is more advantageous than a searched guidance route on the basis of real time operating information obtained from a bus operating as a route bus when a route search that includes walking routes has been made.

BACKGROUND ART

There are conventionally known navigation devices and systems for searching for a route from a desired departure location to a destination point and guiding a user with the aid of map data and road data. Such navigation devices and systems include car navigation devices mounted in automobiles so as to provide the driver with route guidance, navigation systems with a communication feature for sending a route search request to a route search server with the aid of a mobile phone as a navigation terminal and receiving the results and route guidance, as well as other devices and systems.

In particular, navigation systems with a communication feature are systems that use mobile phone or another mobile terminal as a navigation terminal, and are also used as navigation system for pedestrians. Pedestrian navigation systems preferably a route guidance function that includes transportation facilities, and there are navigation systems that, in addition to searching and providing walk route guidance, store route and operating time data of transportation facilities in a route search server, and also have a function for providing guidance along a route (boarding candidate trains) from a desired departure station to a desired destination point station, in addition to searching and providing guidance along a walking route. There are also transportation guidance systems for receiving and displaying routes, timetables, trains that can be boarded, and other information obtained from an information distribution server, and such information is unaccompanied by a route search for a walking route.

A navigation system for searching and providing guidance from a departure point to a destination point is disclosed in, e.g., Patent Reference 1 described below (Japanese Laid-open Patent Application No. 2001-165681) in which movement means constitutes walking, transportation facilities, and an automobile. The navigation system is configured so as to send departure point and destination point information from a mobile terminal device to an information distribution server, and search and provide guidance that matches the search conditions from road and transportation network data in the information distribution server. Examples of the search conditions include walking, automobile, the combined use of railroad and walking, and the like as movement means from the departure point to the destination point, and a route search is carried out using the above as one search condition.

The information distribution server is provided with a database in which the node points, curves, and other data of the roads (routes) in the map data are used as nodes, and also stores link data in which the routes connecting the nodes are used as links, and link cost data having cost information (distance and required time) of all the links. The information distribution server refers to a database, sequentially searches the links that start from the node of a departure point and end at the node of a destination point, and provides guidance by searching for the shortest route by following the nodes and links that minimize the cost information of the links and by using the result as a guidance route. A method referred to as the label determination method or the Dijkstra method is used as the route search technique. A route search method that uses the Dijkstra method is also disclosed in Patent Reference 1.

Also known are route search systems that search and provide guidance for a route from a departure point to a destination point using an airplane, train, trolley, bus, or other transportation means. Such systems are generally configured so as to refer to an operation timetable database, in which the operation timetable of transportation facilities have been organized in a database, on the basis of a user-specified departure time, departure point, destination point, arrival time, and other route search conditions, sequentially follow along routes that use transportation facilities that can be used to connect the departure point and the destination point including transfers, and presents one or a plurality of candidate guidance routes (trains and other transportation means) that match the route search conditions. In general, other route search conditions can also be specified, including required time, number of transfers, fares, and other conditions.

A guidance system is also provided as a search and guidance system related to transportation facilities in which a mobile phone or a terminal device can make a connection to an information distribution server that provides guidance in relation to route and timetable information of transportation facilities, receive information distribution of usable routes, trains, trolleys, and other transportation facilities when a desired departure station, departure time, a destination point station, and the like, and display the information on the terminal device. In the case that such use is made from a common terminal device, a configuration is used in which a URL (uniform resource identifier), domain name, or other address information for specifying the location of the desired download information is inputted to the terminal device, the information distribution server (information site) specified by the address is accessed, and the desired information is downloaded.

A railroad operates accurately in accordance with timetables as long as there has been no accident or vehicle breakdown, and the estimated time of arrival at a major station is suitably announced. The estimated time of arrival at a destination point is suitably announced in accordance with local weather conditions and airport conditions once the aircraft has taken off. In contrast, an express bus or a route bus that operates on ordinary roads is affected by road conditions and traffic congestion, and the time of arrival at a destination point is imprecise.

Even when there is an operation timetable, such is only an approximation. When a passenger has boarded a bus, there are no other choices and the estimated time of arrival cannot be predicted when the bus has entered congested traffic. The passenger often feels uncertainty in that the time of arrival at a destination point cannot be predicted in the particular case that the passenger is using a long-distance bus or an airport limousine bus and has a prescheduled appointment after arriving at a destination point.

In view of the above, attempts have been made to acquire positional information in real time from the buses actually operating along a route, and to provide guidance with good precision in relation to the estimated time of arrival at a bus stop. Such a system has been disclosed in, e.g., Patent Reference 2 (Japanese Laid-open Patent Application No. 2006-301735) and Patent Reference 3 (Japanese Laid-open Patent Application No. 2006-293443).

The bus-waiting time display system disclosed in Patent Reference 2 comprises bus passage time storage means for storing the time at which each bus has passed a bus stop; bus arrival time difference calculation means for calculating the bus arrival time difference between a next-arriving bus and an already-passed bus on the basis of the time difference between the time at which the next-arriving bus that will arrive next at a specified bus stop passes an immediately-preceding passed bus stop passed immediately prior to the specified bus stop and the time at which the already-passed bus that passed the specified bus stop has passed the immediately-preceding bus stop; and bus-waiting time display means for displaying the bus-waiting time obtained by subtracting the current time from the time obtained by adding the bus arrival time difference to the time at which the already-passed bus passed the specified bus stop.

The bus operation state display system disclosed in Patent Reference 3 comprises map information storage means for storing map information that includes bus stop information, operation state storage means for storing the operation state of a bus stopped at the bus stop, and map image creation means for displaying on an information display screen a map image for displaying a bus stop icon that displays the estimated time of arrival at which the bus will arrive at the bus stop.

Patent Reference 4 (Japanese Laid-open Patent Application No. 08-77494) discloses a traffic guidance device for providing route guidance that includes road congestion information, accident information, and other road-related traffic information. The traffic guidance system has an arrival time calculation section that calculates a plurality of times at which at buses on a bus line arrive at a departure point on the basis of: bus lines, scheduled operation time, and other information based on the timetable obtained from a bus timetable information storage section and departure point and destination point information inputted by the departure point/destination point input section; the current position information of buses obtained from the bus position information storage section; and congestion, accident, and other traffic information obtained from the traffic information storage section. Based on the calculated time, the route determination section is configured so as to determine an optimal bus line that will [allow the user] to arrive at a destination point in the shortest time, for example, and to display [the information] on a screen using a route display section 30.

[Patent Reference 1]: Japanese Laid-open Patent Application No. 2001-165681 (FIGS. 1 and 2)

[Patent Reference 2]: Japanese Laid-open Patent Application No. 2006-301735 (FIG. 11)

[Patent Reference 3]: Japanese Laid-open Patent Application No. 2006-293443 (FIGS. 2 and 3)

[Patent Reference 4]: Japanese Laid-open Patent Application No. 08-77494 (FIG. 1)

DISCLOSURE OF THE INVENTION

Problems the Invention is Intended To Solve

All of the systems disclosed in Patent References 2 through 4 acquire in real time the position of a bus operating on a route, predict the arrival time, and provide route guidance, and can be used when the user specifies a bus line as a route search condition.

In common application, there are many cases in which the user has not grasped the network of the bus line in detail. There are many cases in particular in which the use of a bus line is excluded from the route search conditions for a user who is not familiar with the geography of the destination point to be visited for the first time. In such a case, the use of walking and trains is commonly used as route search conditions. For example, a walking route to the nearest station in the area of the departure point is searched, a route using train lines from the station nearest to the departure point to the nearest destination point station in the area of the destination point is searched, and a walking route to the destination point from the nearest destination point station is searched.

Therefore, the user follows a guided walking route and moves from a departure point to the station nearest to the departure point, arrives at the station nearest to the destination point, and then moves along a guided walking route from the station nearest to the destination point to the destination point.

At this point, a recommended route may be available whereby it is possible to arrive earlier at the nearest station or destination point by using a bus line than by the walking route for which guidance has actually been provided. In the particular case that the position, the movement speed, and the like of a bus operating along a bus line can be acquired in real time, it may be able to arrive earlier at the nearest station by using a bus that is approaching a bus stop along the route that the user is moving along. However, with the systems disclosed in Patent References 2 through 4, there is a problem in that there is no means for making notification of the availability of such a recommended route or alternative route to the user who made the request for a route search that is not predicated on the use of a bus line.

In a common navigation system, when a route is searched in accordance with route search conditions set by the user and the user is presented with a guidance route obtained by the route guidance to carried out route guidance, the user must again reset the search conditions in the case that the user desires to modify the content of the route guidance. Even though a walking route has been provided in such a system, there are cases in which the time required to reach a destination point can be reduced by riding a bus due to changing traffic conditions, e.g., the clearing of road traffic congestion and other changes. However, with the systems disclosed in Patent References 2 through 4, there is a problem in that there is no provision for a new alternative route to be generated when traffic conditions change and the user cannot be notified of the availability of such a route.

The inventor of the present invention, as a result of thoroughgoing research to solve the problems described above, perfected the present invention having concluded that the problems described above can be solved by acquiring bus operation conditions in real time, conducting a route search in accordance with route search conditions set by the user, searching for an alternative route during ongoing route guidance that uses a bus on the basis of the bus operation conditions in the case that a bus can be used in the guidance route when the guidance route includes a walking route, and providing notification of the alternative route in the case that an alternative route is available that is more advantageous that the guidance route.

In other words, an object of the present invention is to provide a navigation system that can search for an alternative route that uses a bus on the basis of real time operation service information obtained from a bus operating along a bus line when a route search that includes a walking route has been made, and provide notification of such in the case that an alternative route is available that uses a bus and is more advantageous than the searched guidance route.

Means for Solving the Abovementioned Problems

In order to solve the problems described above, a first aspect of the present invention is a navigation system having a route search server provided with route searching means for referring to route search network data on the basis of a route search request that includes a departure location and a destination point and for searching for a guidance route that includes a route that makes use of transportation facilities; and a mobile terminal device provided with display means for displaying a guidance route searched by the route search means and GPS receiving means for detecting a current position, wherein the route search server has an operation service information database in which the current position of each bus operating on a bus line is acquired and stored, and alternative route search means for evaluating and providing guidance for an alternative route that uses a bus, the navigation system characterized in that in the case that a walking route interval is included in the guidance route, the route search means refers to the operation service information database on the basis of the current position of the mobile terminal device, and searches for an alternative route that substitutes for the walking route interval by specifying a bus that a user of the mobile terminal device can board; and the alternative route guidance means compares route data of the alternative route and the guidance route, transmits alternative route information that shows the presence of an alternative route to the mobile terminal device in the case that an alternative route is a more advantageous route than the guidance route, and displays the guidance route on the display means to provide notification of an alternative route.

In the first aspect of the present invention, the route search means is characterized by searching for a bus stop in a predetermined range of a mobile terminal device on the basis of the current position of the mobile terminal device when a search is made for the alternative route, referring to the operation service information database, specifying a bus that a user of the mobile terminal device can board, and searching for the alternative route.

In the first aspect of the present invention, the alternative route guidance means is characterized by comparing the route data of the guidance route and the alternative route and determining whether the alternative route is more advantageous than the guidance route in relation to any one among the time of arrival at a destination point, the route fare, and the number of transfers.

In the first aspect of the present invention, the navigation system is characterized in that guidance about the availability of the alternative route is not provided in the case that the bus riding distance in the alternative route is less than a predetermined distance.

In the first aspect of the present invention, the navigation system is characterized in that guidance about the availability of the alternative route is not provided in the case that the mobile terminal device is not in a walking route interval or in the case that a route search that includes a bus line is set to be a route search condition.

In the first aspect of the present invention, the navigation system is characterized in that the operation service information database referenced, the scheduled time until the bus specified for the user of the mobile terminal device arrives at the next scheduled bus stop is calculated, and guidance about the availability of the alternative route is not provided in the case that the scheduled time is less than a predetermined time.

A second aspect of the present invention is a route search server having route search means for connecting via a network to a mobile terminal device having display means for displaying a guidance route and GPS receiving means for detecting the current position, referring to a route search network data on the basis of a route search request that includes a departure point and a destination point, and searching for a guidance route that includes the use of transportation facilities, wherein the route search server has an operation service information database for acquiring and storing the current position of each bus operating along a bus line, and alternative route guidance means for evaluating and providing guidance along an alternative route that uses a bus, the route search server characterized in that in the case that a walking route interval is included in the guidance route, the route search means refers to the operation service information database on the basis of the current position of the mobile terminal device, specifies a bus that can be boarded by the user of the mobile terminal device, and searches for an alternative route for substituting the walking route interval; and the alternative route guidance means compares the route data of the alternative route and the guidance route, transmits the alternative route information indicating the availability of an alternative route to the mobile terminal device in the case that the alternative route is a more advantageous route than the guidance route, displays the guidance route on the display means, and provides guidance about the availability of an alternative route.

In the second aspect of the present invention, the route search server is characterized in that the route search means searches for a bus stop in a predetermined range of a mobile terminal device on the basis of the current position of the mobile terminal device when a search is made for the alternative route, refers to the operation service information database, specifies a bus that a user of the mobile terminal device can board, and searches for the alternative route.

In the second aspect of the present invention, the alternative route guidance means is characterized by comparing the route data of the guidance route and the alternative route and determining whether the alternative route is more advantageous than the guidance route in relation to any one among the time of arrival at a destination point, the route fare, and the number of transfers.

In the second aspect of the present invention, the route search server is characterized in that guidance is not provided about the availability of the alternative route in the case that the bus riding distance in the alternative route is less than a predetermined distance.

In the second aspect of the present invention, the route search server is characterized in that guidance about the availability of the alternative route is not provided in the case that the mobile terminal device is not in a walking route interval or in the case that a route search that includes a bus line is set to be a route search condition.

In the second aspect of the present invention, the route search server is characterized in that the operation service information database is referenced, the scheduled time until the bus specified for the user of the mobile terminal device arrives at the next scheduled bus stop is calculated, and guidance is not provided about the availability of the alternative route in the case that the scheduled time is less than a predetermined time.

A third aspect of the present invention is a mobile terminal device that connects via a network to a route search server provided with route searching means for referring to route search network data on the basis of a route search request that includes a departure location and a destination point and searching for a guidance route that includes a route that makes use of transportation facilities, and comprises display means for displaying a guidance route searched by the route search means and GPS receiving means for detecting the current position, wherein the route search server has an operation service information database for acquiring and storing the current position of each bus operating along a bus line, and alternative route guidance means for evaluating and providing guidance along an alternative route that uses a bus, the mobile terminal device characterized in that the route search means, in the case that a walking route interval is included in the guidance route, refers to the operation service information database on the basis of the current position of the mobile terminal device, specifies a bus that can be boarded by the user of the mobile terminal device, and searches for an alternative route for substituting the walking route interval;

the alternative route guidance means compares the route data of the alternative route and the guidance route, and transmits the alternative route information indicating the availability of an alternative route to the mobile terminal device in the case that the alternative route is a more advantageous route than the guidance route; and the mobile terminal device displays the guidance route on the display means and provides guidance about the availability of an alternative route.

A fourth aspect of the present invention is a route guidance method in a route search server having route search means for connecting via a network to a mobile terminal device having display means for displaying a guidance route and GPS receiving means for detecting the current position, referring to a route search network data on the basis of a route search request that includes a departure point and a destination point, and searching for a guidance route that includes the use of transportation facilities, wherein the route search server has an operation service information database for acquiring and storing the current position of each bus operating along a bus line, and alternative route guidance means for evaluating and providing guidance along an alternative route that uses a bus, the route guidance method characterized in comprising:

a step in which, in the case that a walking route interval is included in the guidance route, the route search means refers to the operation service information database on the basis of the current position of the mobile terminal device, specifies a bus that can be boarded by the user of the mobile terminal device, and searches for an alternative route for substituting the walking route interval; and a step in which the alternative route guidance means compares the route data of the alternative route and the guidance route, and transmits the alternative route information indicating the availability of an alternative route to the mobile terminal device in the case that the alternative route is a more advantageous route than the guidance route.

Effect of the Invention

In the first aspect of the present invention, when a route search is carried out in accordance with route search conditions set by the user and a walking route is included in the guidance route while the route guidance is being carried out, an alternative route is searched that uses a bus on the basis of the bus operation conditions in the case that a bus can be used in the guidance route, and notification of the alternative route is provided in the case that an alternative route is available that is more advantageous that the guidance route. Therefore, the user of a mobile terminal device who is moving by walking can select a movement by bus.

In the second aspect of the present invention, it is possible to provide a route search server composed of the navigation system according to the first aspect of the present invention. In the third aspect of the present invention, a mobile terminal device composed of the navigation system according to the first aspect can be provided. In the fourth aspect of the present invention, a route search method for implementing the navigation system of the first aspect of the present invention can be provided.

KEY TO SYMBOLS

Figure 1:
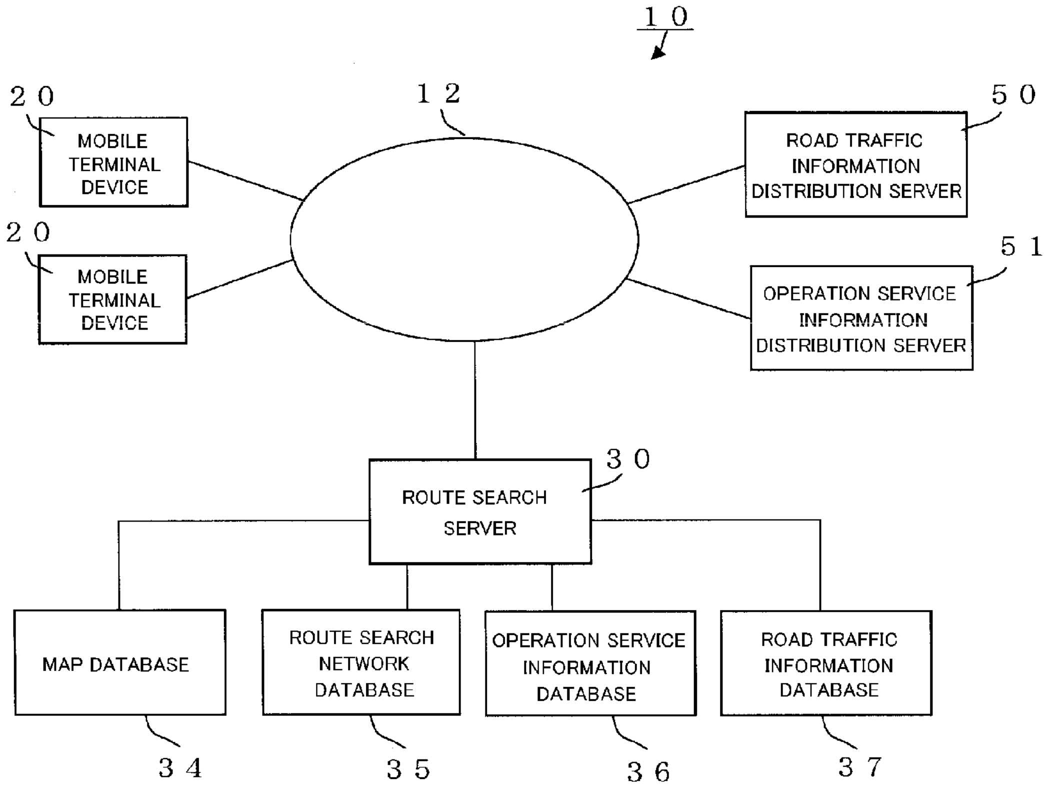
FIG. 1 is a diagram of the system configuration showing the configuration of the navigation system of an example of the present invention.

10 navigation system
12 network
20 mobile terminal device
201 control means
21 communication means
22 GPS receiver means
23 search request means
24 conditions setup means
25 guided route data storage means
26 display means
27 operation input means
30 route search server
301 control means
31 communication means
32 guidance data editing means
33 alternative route guiding means
34 map database
35 route search network database
36 operation service information database
37 road traffic information database

38 search request storage means

39 route search means

BEST MODE FOR CARRYING OUT THE INVENTION

Specific examples of the present invention will be described in detail hereinafter with reference to embodiments and drawings. However, the embodiments described below are examples of a navigation device intended to describe in detail the technological concept of the present invention, and are not intended to limit the present invention to the navigation device described in the examples. The present invention can be equally applied to a navigation device of other embodiments within the scope of the claims.

FIG. 1 is a diagram of the system configuration showing the configuration of the navigation system 10 of an example of the present invention. As shown in FIG. 1, the navigation device 10 is provided with a mobile terminal device 20 and a route search server 30 via a network 12. The navigation system 10 is provided with a road traffic information distribution server 50 for providing as road traffic information the state of road traffic congestion, traffic accidents, road construction, and the availability of other factors obstructing traffic; an operation service information distribution server 51 for acquiring in real time the current position of each bus operating along a bus line and providing to common users or the like information about the arrival time at the bus stop; and other components.

The route search server 30 can acquire real time operation service information of buses and road traffic information from the road traffic information distribution server 50 and the operation service information distribution server 51 via the network 12 and can add [such information] to its own database. Also, required data can similarly be acquired from various information distribution servers (not shown), a search request accompanied by desired search conditions can be transmitted and desired search results obtained, and data can be stored in a database (not shown).

The navigation system 10 of the present invention is not limited to the configuration described above and may have a navigation service function and a map distribution server function for distributing a map of a POI (point of interest) location. Also, a mobile phone can be used as the mobile terminal device 20, and it is also possible to use a PDA, a music player, a mobile game device, and other mobile devices.

The route search server 30 shown in FIG. 1 is provided with a map database 34 and a route search network database 35, and refers to the route search network database 35 to conduct a route search when a route search request has been made from the mobile terminal device 20. [The route search server 30] also has a common navigation function for transmitting a guidance route (optimal route or a plurality of candidate routes) obtained from the result of the route search to the mobile terminal device 20. When a desired geographical point or a POI has been specified from the mobile terminal device 20 and a map data acquisition request has been made, the map database 34 is referenced, and the corresponding map data is read and transmitted to the mobile terminal device 20.

The route search network database 35 is provided with road network data for searching for a movement route by automobile or walking as described later, and transportation network data for searching for a movement route that uses transportation facilities, and can search for a movement route that uses walking or automobile, and transportation facilities. When a route search request is made in which route buses are included in the transportation facilities and route search conditions that include transportation facilities as movement means are set by the mobile terminal device 20, the transportation network data is referenced and a route search that includes bus lines and train routes is carried out. In such a case, a route search is carried out using real time operation service information stored in an operation service information database 36 and road traffic information stored in a road traffic information database 37.

The route search server 30 performs a route search by referencing the road network data stored in the route search network database 35 in the case that a route search request from the mobile terminal device 20 has been made in which the route search conditions have been set so that transportation facilities are not used as movement means. When a route search request is made that includes transportation facilities as a movement means, the route search server 30 performs a search by referencing the road network data and the transportation network data stored in the route search network database 35.

The route search server 30 transmits the result (optimal route and candidate routes) of the route search conducted in the manner described above to the mobile terminal device 20. When the desired guidance route has been selected using the mobile terminal device 20 and route guidance has been requested, the route search server 30 transmits the guidance route data and map data to the mobile terminal device 20 and begins route guidance. At this point, the route search server 30 carries out searching and guidance in the manner described below. In other words, the route search server 30 first determines whether a walking route interval is included in the guidance route. An alternative route by bus is searched based on the bus operation state in the case that a walking route interval is included and a bus can be used in the walking route interval. Specifically, the route search server 30 acquires from the operation service information database 36 the operation service information of buses operating on the bus line that overlaps the walking route obtained from the search results, specifies a bus that the user of the mobile terminal device 20 can board on the basis of the current position of the mobile terminal device 20, and searches for an alternative route.

The route search server 30 compares the alternative route thus searched with the guidance route, and transmits the alternative route information indicating the availability of the alternative route to the mobile terminal device 20 if it is determined that the alternative route is more advantageous than the guidance route. The mobile terminal device 20 displays the guidance route together with the alternative route guidance in the case that an advantageous alternative route is available. An advantageous alternative route is based on route search conditions set by the user, and is, e.g., a route in which the arrival time at the destination point can be shortened, a route with a lower fare, or a route with fewer transfers.

The alternative route information that provides guidance about the availability of an alternative route is content about the availability of an alternative route that is provided to the user of the mobile terminal device 20, an example of which is "A bus bound for ZZ will arrive in two minutes at the SS bus station 10 meters ahead. You can shorten the time to your destination point by 10 minutes by taking this bus." Such a notification allows the user of the mobile terminal device 20 to know of information about an alternative route that is more advantageous than the guidance route while the user of the mobile terminal device 20 is moving through a walking route interval. Therefore, the user can board the indicated bus at the next bus stop. The procedure noted above will be described in detail at a later point.

Figure 2:
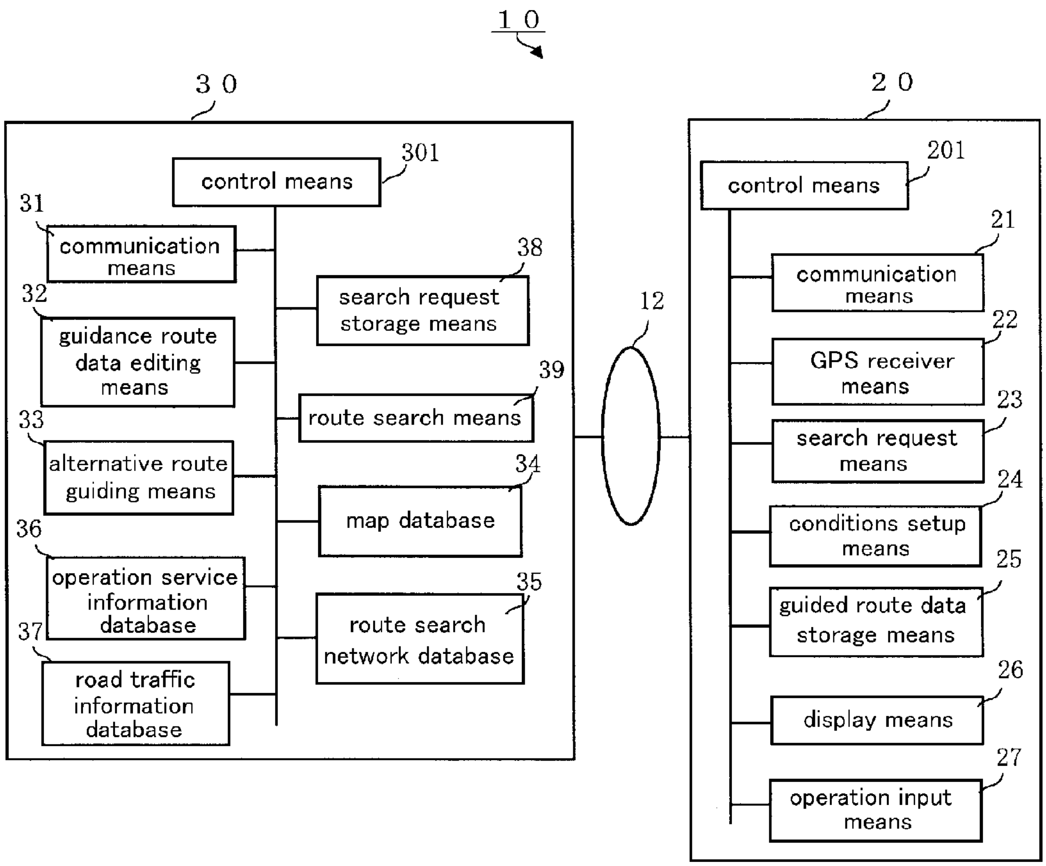
FIG. 2 is a block diagram showing the detailed configuration of the navigation system of an example of the present invention.

The present invention is described below using a specific example, but the detailed configuration of the navigation system 10 of the present invention is described first. FIG. 2 is a diagram showing the detailed configuration of the navigation system 10 of FIG. 1.

The mobile terminal device 20 is a terminal that can receive a navigation service, and is composed of control means 201, communication means 21, GPS receiver means 22, search request means 23, condition setup means 24, guided route data storage means 25, display means 26, and operation input means 27.

The route search server 30 is composed of control means 301, communication means 31, guidance data editing means 32, alternative route guiding means 33, a map database 34, a route search network database 35, a operation service information database 36, a road traffic information database 37, search request storage means 38, and route search means 39.

In the mobile terminal device 20, the control means 201 is a microprocessor provided with a RAM, a ROM, and a processer (not shown), and controls the operation of each component via a control program stored in the ROM. The communication means 21 is a communication interface for transceiving communication data with the route search server 30 or the like via a network 12.

The GPS receiver mean 22 receives a signal from a GPS satellite and calculates the current position using latitude and longitude. The operation input means 27 has a key, a dial, or the like, is used for performing input for operating the mobile terminal device 20, and is used for inputting the destination point or other search conditions. The display means 26 has a liquid crystal display panel or the like and is used for displaying a guidance route, a recommended route, or a map delivered (transmitted) by the route search server 30. The display means 26 also functions as input means for displaying a menu screen and operating the mobile terminal device 20.

The guidance route, alternative route, and other guidance data transmitted from the route search server 30 to the mobile terminal device 20 is stored in the guided route data storage means 25 together with map data, and the guidance route data and map data stored in the guided route data storage means 25 are read as required and displayed by the display means 26.

Figure 3:
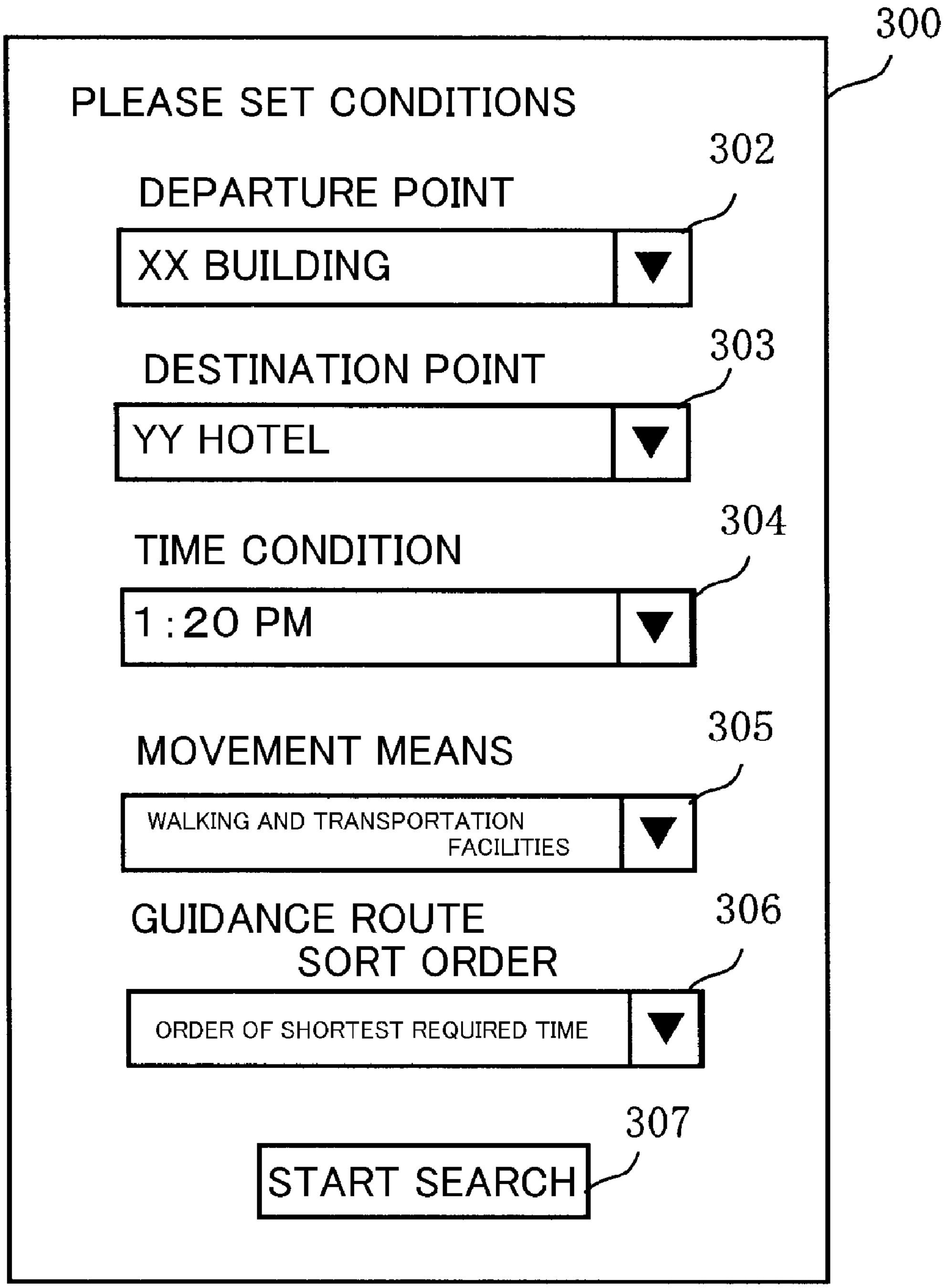
FIG. 3 is a screen configuration view showing an example of the screen for setting route search conditions displayed on display means in a mobile terminal device.

FIG. 3 is a screen configuration view showing an example of the screen for setting route search conditions displayed on display means 26 in a mobile terminal device 20. The search request means 23 transmits route search requests to the route search server 30 on the basis of operation and conditions inputted via the operation input means 27. In the case that a route search request is made to the route search server 30, a desired departure point and destination point are set using the operation input means 27 or the menu (see FIG. 3) displayed by the display means 26 in the same manner as a conventional terminal device.

The route search conditions input screen 300 shown in FIG. 3 is provided with a departure point input column 302, a destination point input column 303, a time condition input column 304, a movement means input column 305, a guidance route sort order input column 306, and a search start button 307. The departure point and the destination point are set by inputting an address or a telephone number, a station name, a building name, or another geographical name, or the latitude and longitude or the like to the departure point input column 302 and the destination point input column 303. In other words, the input column is, in principle, capable of free word input, but it is also possible to provide the setting using an address, telephone number, POI (point of interest) name, or the like.

A pull-down button can be operated to call up and set a registered geographical point or a route search history recorded in the mobile terminal device 20 up to the current time. The departure date and time, the destination point arrival data and time, and other time conditions are inputted to the time condition input column 304. Setting can be omitted in the case that time conditions are not required to be set. Movement means is inputted in the movement means input column 305. Walking, automobile, transportation facilities, and the like can be set as the movement means, and it is also possible to set a combination walking and transportation facilities, or a plurality of other movement means.

The guidance route sort order input column 306 is used for setting the sequence in which the guidance routes are to be outputted in the case that a search request is made for a plurality of candidate routes. Any output order can be set, including the order of shortest time required, the order of the lowest fare, the order of the fewest number of transfers, and the like. As a default, the guidance route is sorted in the order of the shortest time required in the case that an output order has not been specified.

When the route search conditions are set using the route search conditions input screen 300 shown in FIG. 3, the search request means 23 edits and transmits to the route search server 30 the route search conditions set together with the ID of the mobile terminal device 20 to request a route search.

On the other hand, when the route search server 30 receives a route search request from the mobile terminal device 20, the request is temporarily stored in the search request storage means 38. The route search means 39 references the route search network database 35 in accordance with the route search request stored in the search request storage means 38 and searches a plurality of candidate routes from the departure point to the destination point. The guidance route data obtained as a result of the route search is transmitted to the mobile terminal device 20 together with map data read from the map database 34. The route search method in the route search means 39 is the same method as the route search server in an ordinary navigation system.

A route search in the route search means 39 includes the case in which the shortest and most optimal route in terms of required time or required distance is searched and guidance is provided, and the case in which a plurality of candidate routes is searched, the routes are sorted in the order of the shortest time or the shortest distance, and guidance is provided. In the Dijkstra method, the route having the smallest cost is searched first, and a plurality of candidate routes can be pursued to the Kth shortest route using a marching algorithm. In a route search that includes transportation facilities as a movement route, the fare, the number of transfers, and the like may be set as the route search conditions, and generally, a plurality of candidate routes are searched, the guidance route is sorted in accordance with the route search conditions thus set, and the routes are presented [to the user].

Figure 4:
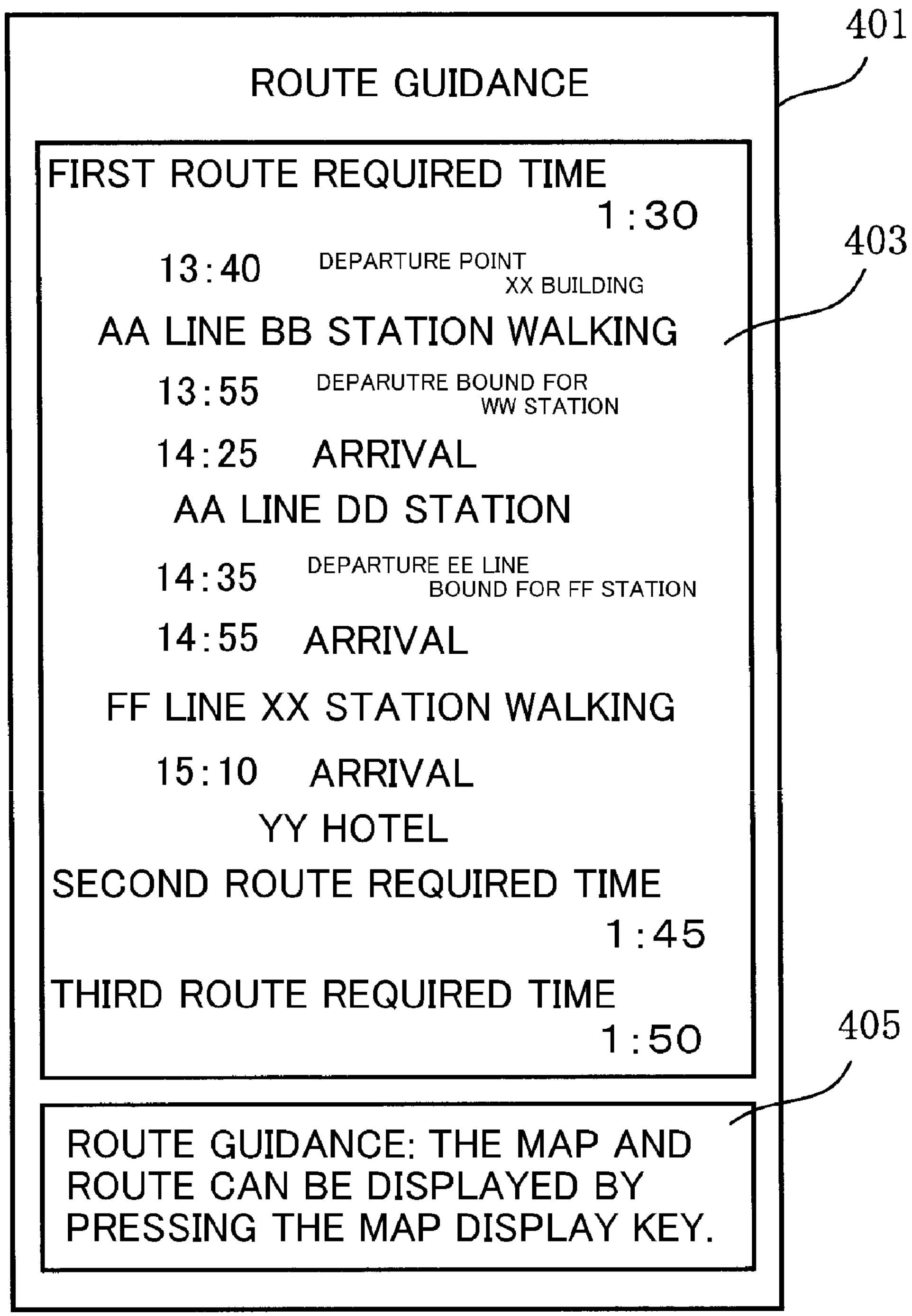
FIG. 4 is a screen configuration view showing an example of the display screen of a guidance route displayed on the mobile terminal device.

The guidance route data obtained as a result of the route search is edited by the guidance data editing means 32 and transmitted to the mobile terminal device 20 via the communication means 31. FIG. 4 is a diagram showing an example of the screen configuration in the case that the guidance route transmitted from the route search server 30 is displayed on the display means 26 of the mobile terminal device 20. When a plurality of candidate routes has been searched, the details of the first route to the nth route are sequentially displayed in the order sorted in accordance with the sort order in a route search display region 403 of a display screen 401. Comments are displayed in a comment display column 405 in the case that a map or guidance route is displayed, and the map or guidance route contained in a clicked location is displayed when a desired display of any candidate route is clicked to operate the map display key (not shown), and the route guidance is started.

For example, when the departure point of the first route of FIG. 4 is clicked to operate the map display key, a map having predetermined reduced scale containing the departure point is displayed by the display means 26, the guidance route or the current position or the like of the mobile terminal device 20 is superimposed and displayed on the map image, and route guidance is started. At this point, a request for map data required for display and for starting route guidance is transmitted from the mobile terminal device 20 to the route search server 30. The route search server 30 references the map database 34 and reads and transmits the requested map data to the mobile terminal device 20.

Figure 5:
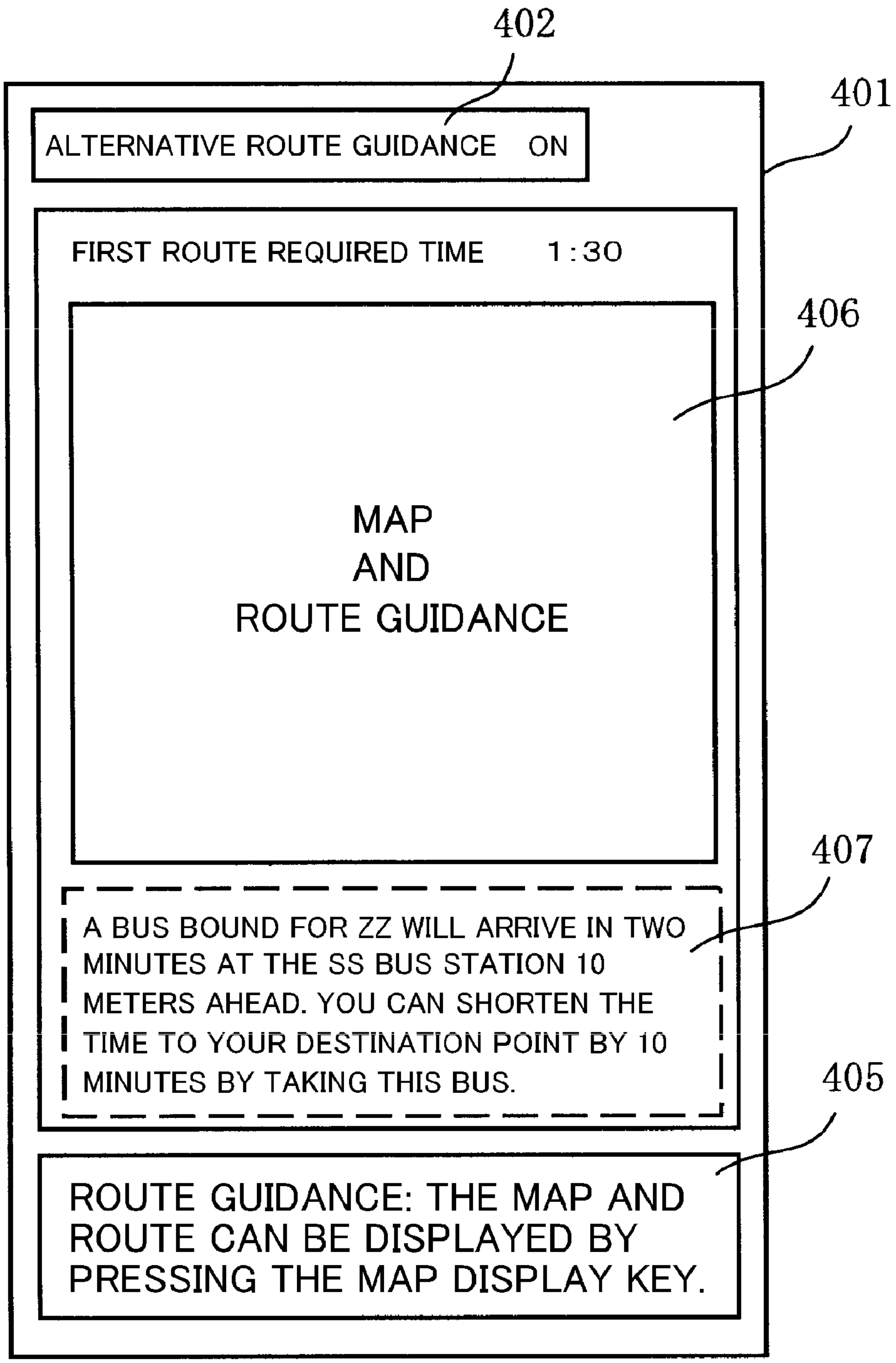
FIG. 5 is a screen configuration view showing an example of the map display screen displayed by the display means during route guidance.

FIG. 5 is a screen configuration view showing an example of the map display screen displayed by the display means 26 when a candidate route has been selected by the user of the mobile terminal device 20 in the manner described above and route guidance has been started. A map, a guidance route, and the like are displayed in a map display region 406, and guidance (guiding) is outputted by display or audio as required. For example, right turn or left turn guidance for an intersection or the like is outputted when the mobile terminal device 20 is moving in a walking route interval. The train to be boarded or the departure platform of the train onto which a transfer must be carried out, the departure time, and other guidance is outputted when movement is through a railroad station. The guidance information of an alternative route is displayed in the guidance information display region 407 as described later.

Figure 6:
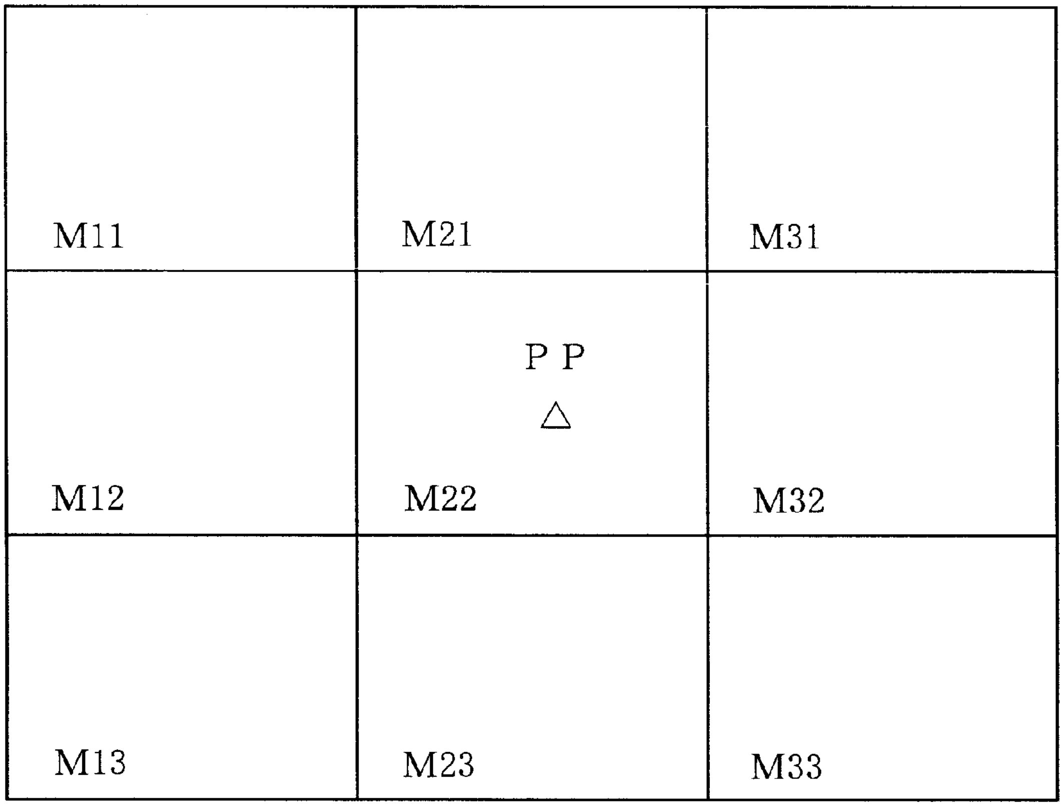
FIG. 6 is a diagram showing the configuration of map data stored in a map database.

FIG. 6 is a diagram showing the configuration of map data stored in the map database 34. Map data is composed of unit map data divided into predetermined ranges of latitude and longitude, as shown in FIG. 6. In other words, the map data is composed of unit map data M11 to M33 . . . in a grid in which map areas are divided into predetermined latitudinal and longitudinal units, as shown in FIG. 6. In the case that the map data is delivered to the mobile terminal device 20, a total of nine unit maps, i.e., unit map data M21, M23, M12, M32, M11, M13, M31, M33 is delivered, the unit maps being adjacent in the vertical, horizontal, and diagonal directions about the center unit map data M22 that contains the current position PP of the mobile terminal device 20.

When the mobile terminal device 20 moves and there are insufficient map data, the movement direction of the mobile terminal device 20 is determined, and the route search server 30 delivers the needed portion of unit map data. The same procedure applies when the mobile terminal device 20 requests delivery of map data for a specific point or position of a POI (point of interest). The guide route data are delivered together with the vector map data to the mobile terminal device 20. The mobile terminal device 20 thus receives the map data and guide route data from the route search server 30 and displays the map and the guide route in the display means 28.

When route guidance is started in the mobile terminal device 20 as described above, the route search server 30 switches on (ON) the alternative route guidance function and the route search means 39 performs an alternative route search in the manner described below. In other words, the route search means 39 first determines whether there is a walking route interval in the guidance route (the candidate route selected in the display screen of the FIG. 4) selected in the mobile terminal device 20.

When a walking route interval is not present, an alternative route search is not performed and alternative route guidance is also not provided to the mobile terminal device 20. When a walking route interval is present, it is determined whether a bus line is available on the current movement route on the basis of the current position of the mobile terminal device 20. If a bus line is available, a search is made for a bus stop in a predetermined range in the forward movement direction of the mobile terminal device 20. Reference is made to the operation service information database 36 and the time to arrival and the time of arrival at the bus stop is predicted on the basis of the position and passage time of the bus moving toward the bus stop in question.

The time prediction can be made with consideration given to congestion information and accident information stored in the road traffic information database 37. When consideration is given to road traffic information, the time of arrival of the bus at the bus stop can be more accurately predicted.

Next, the route search means 39 compares the estimated time of arrival of the bus and the estimated time of arrival of the user of the mobile terminal device 20 at the bus stop by walking, and determines whether the bus can be boarded. When a bus can be boarded, a route search for an alternative route that uses a bus is performed, the time of arrival at the destination point, the fare, the number of transfers, and the like is calculated to the destination point, and the result is sent to the alternative route guiding means 33.

Next, the alternative route guiding means 33 compares the alternative route data obtained from the route search means 39 and the guidance route data of the route guidance requested by the user of the mobile terminal device 20, and determines whether the alternative route is a more advantageous route than the guidance route. For example, the alternative route is determined to be more advantageous than the guidance route when the time of arrival at the destination point in the alternative route is earlier than the time of arrival in the guidance route.

The alternative route is determined to be more advantageous than the guidance route also when the number of transfers in the alternative route is less than the number of transfers in the guidance route. Similarly, the alternative route is determined to be more advantageous than the guidance route also when the fare in the alternative route is less than the fare in the guidance route. Any of the items to be used for comparison is used in accordance with the route search conditions. In the route search conditions shown in FIG. 3, sorting by the "shortest required time" is specified, and the alternative route is determined to be more advantageous than the guidance route when the time of arrival at the destination point in the alternative route is earlier than the time of arrival in the guidance route.

The route search server 30 transmits the alternative route information that provides notification of the availability of an alternative route to the mobile terminal device 20 in the case that the alternative route guiding means 33 has determined the that alternative route is more advantageous than the guidance route. The alternative route information may be, e.g., "A bus bound for ZZ will arrive in two minutes at the SS bus station 10 meters ahead. You can shorten the time to your destination point by 10 minutes by taking this bus." Such a notification is content for notifying the user of the mobile terminal device 20 of the availability of an alternative route.

The mobile terminal device 20 displays the information in the guidance information display region 407 of FIG. 5 when such alternative route information is received from the route search server 30. Guidance of the alternative route is not limited to display, and audio output may be used, or a combination of display and audio output may be used. Since this guidance allows the user of the mobile terminal device 20 to made aware of the availability of an alternative route that uses a bus, which is more advantageous than the guidance route in current use (the route requested in the route guidance), the user can board the bus from the bus stop to which guidance has been provided, and the alternative route can be selected.

The concept of a route search in the route search server 30 will be described next. Road network data for searching for a movement route by walking or by automobile, and transportation network data for searching for a movement route using public transportation facilities, are stored in the route search network database 35. The route search means 39 references the route search network database 35 and searches for a route that uses walking or automobile, or a route that combines the use of walking and transportation facilities.

The road network data are configured as described below. For example, when the roads are composed of roads A, B, and C as shown in FIG. 7, the end points, intersection points, turning points, and other points of roads A, B, and C are designated as nodes; roads linking the nodes are indicated by directional links; and the network data are composed of node data (node latitude/longitude), link data (link numbers), and link cost data in which link costs (distance between links or time required to travel to a link) between links are in the form of data.

Figure 7:
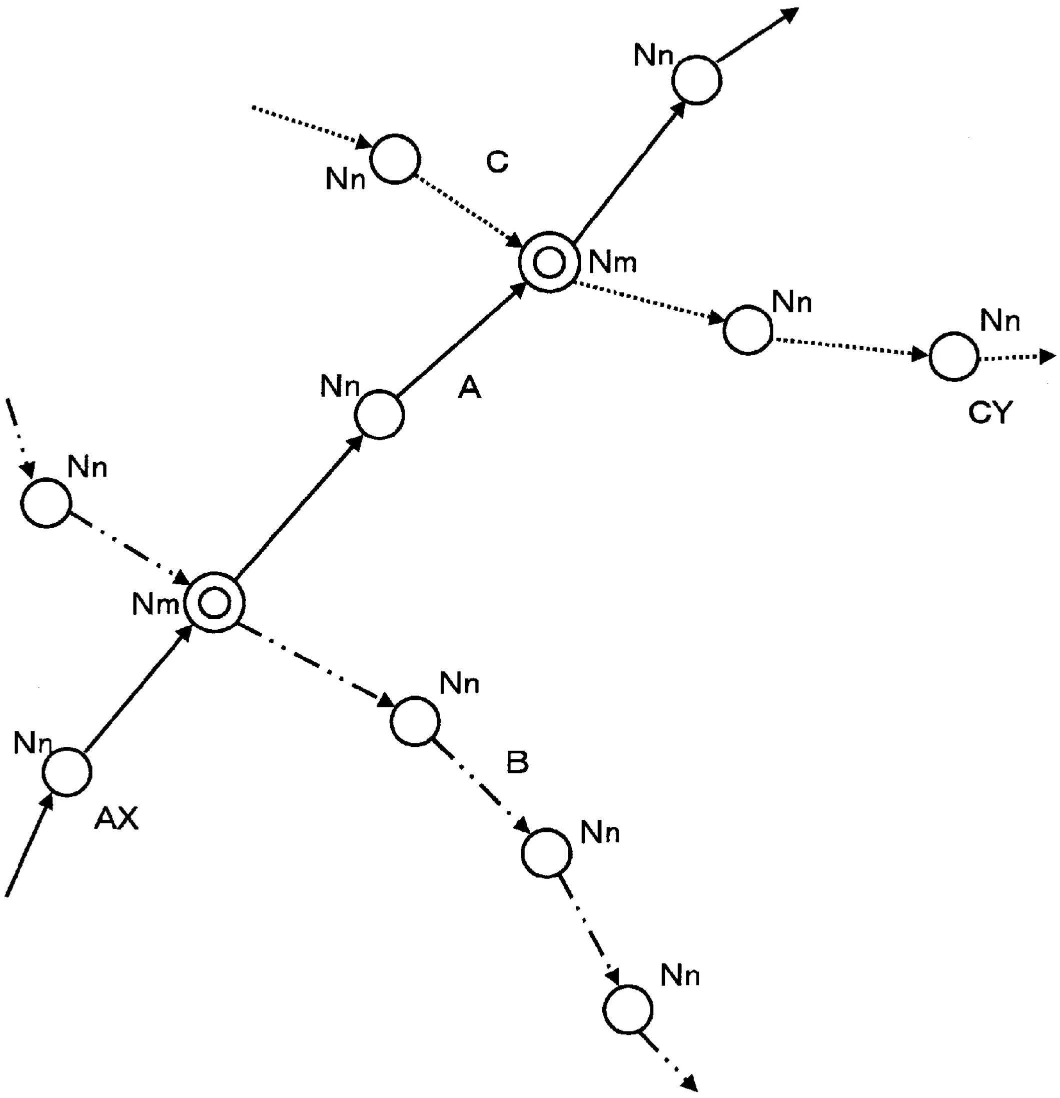
FIG. 7 is a schematic view showing the concept of road network data.

Specifically, in FIG. 7, the reference symbols Nn (○) and Nm (◎) indicate nodes, wherein Nm (◎) indicates an intersection of roads. Directional links between nodes are indicated by arrow lines (solid lines, dashed lines, chain double-dashed lines). Links in the upstream and downstream directions of the roads are present, but only links in the direction of the arrows are shown in FIG. 7 to simplify the diagram.

When the data of such a road network is route-searched as a database for route searching, a link connected from the node of the departure point to the node of the destination point is traced, the link cost is accumulated, and the route having the smallest accumulated link cost is searched and used for guidance. Specifically, when a route search is performed using node AX in FIG. 7 as the departure point and node CY as the destination point, the link to node CY is traced in which road A is traveled from node AX, and a right turn into road C is made at the second intersection point, then the link cost is accumulated and the route having the smallest accumulated value for the link cost is searched and used for guidance.

Other routes from node AX to node CY are not shown in FIG. 7. However, other routes actually exist, and routes whereby it is possible to reach node CY from node AX are therefore searched in the same manner, and the route having the smallest link cost among the searched routes is determined to be the optimum route. This technique is in accordance with the well-known technique known as Dijkstra's method, for example.

Figure 8:
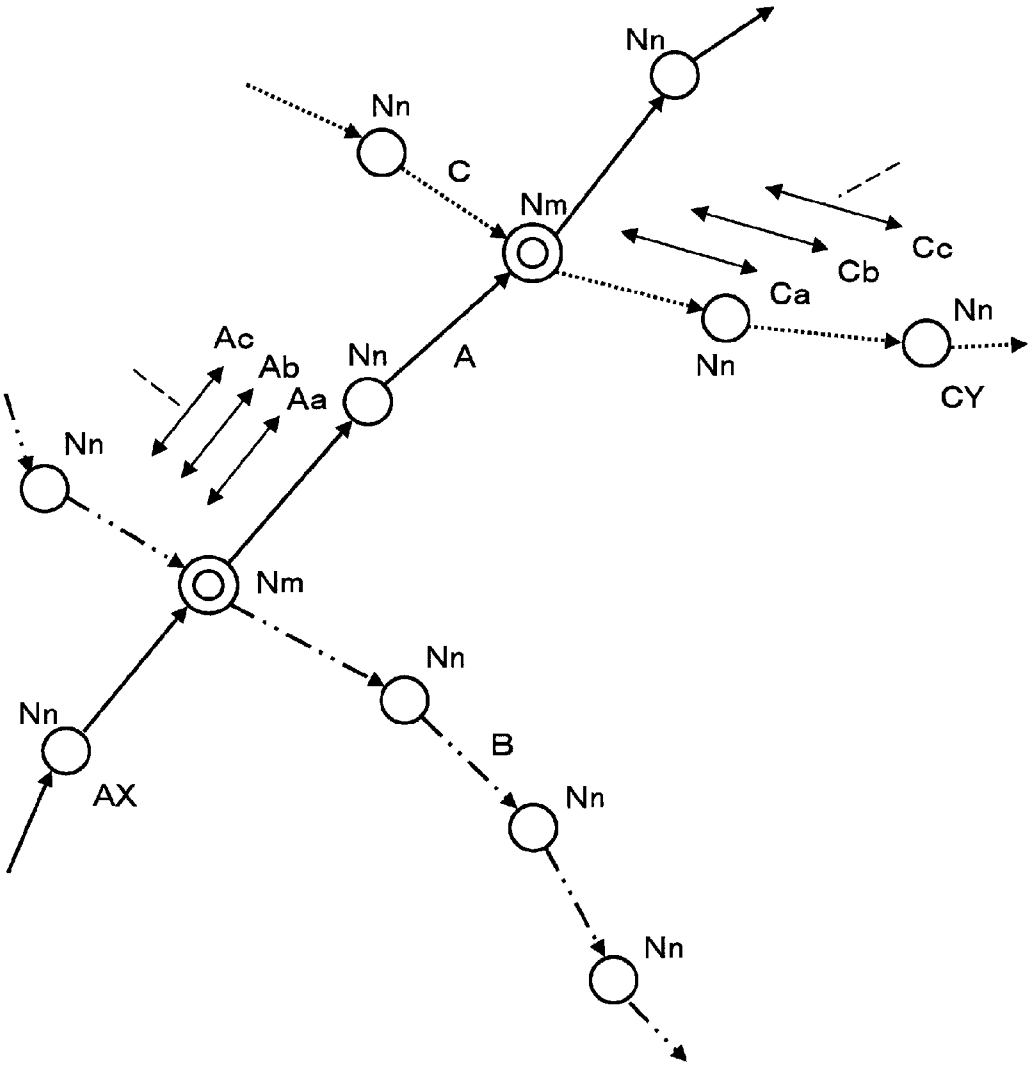
FIG. 8 is a schematic view showing the concept of transportation network data.

In contrast, transportation network data for a route search of transportation facilities are configured as described below. For example, when the transportation network data are composed of transportation lines A, B, and C as shown in FIG. 8, for example, train stations (airports in the case of an airplane route) provided to the transportation lines A, B, and C are designated as nodes, intervals linking the nodes are indicated by directional links, and node data (node latitude/longitude) and link data (link numbers) form the network data. In FIG. 8, the reference symbols Nn (○) and Nm (◎) indicate nodes, wherein Nm (◎) indicates a connection point (train-changing station or the like) between transportation routes, and directional links between nodes are indicated by arrow lines (solid lines, dashed lines, chain double-dashed lines). Links in the upstream and downstream directions of the roads are present, but only links in the direction of the arrows are shown in FIG. 8 to simplify the diagram.

However, the link costs in a transportation network are fundamentally different from those of a road network. Specifically, the link costs in the road network are fixed and static, whereas the transportation network has a plurality of trains or aircraft (trains, aircraft, and other routes are referred to hereinafter as modes of transportation) moving through the transportation lines, as shown in FIG. 8. The times of departure from the nodes of each mode of transportation are specific, as are the times of arrival at the subsequent nodes (specified in the timetable data and traffic data). There are also cases in which the routes do not necessarily link to adjacent nodes. This situation occurs in the case of express trains and local trains, for example. In such a case, a plurality of different links is available on the same transportation line, and the time required to travel between nodes may change according to the mode of transportation.

The example of the transportation network shown in FIG. 8 includes a plurality of transportation means (routes) Aa through Ac in the same link of a transportation line A, and a plurality of transportation means (routes) Ca through Cc in a transportation line C. Accordingly, the operation network of a transportation facility differs from a simple road network; the amount of data relating to nodes, links, and link costs therein is proportional to the sum total of the transportation means (routes of individual aircraft, trains, and the like). Accordingly, the amount of transportation network data is therefore extremely large in comparison to the amount of road network data. A correspondingly large amount of time is therefore needed to perform a route search.

All transportation means that can be used (boarded) to travel from a departure point to a destination point must be searched, and a transportation means that satisfies the search conditions must be specified in order to search the route from a certain departure point to a certain destination point using the type of transportation network data described above.

For example, in FIG. 8, when a route search is performed in which the departure point is node AX of transportation line A, a certain departure time is specified, and the destination point is node CY of transportation line C, all the transportation means subsequent to the departure time among the transportation means Aa through Ac traveling on transportation line A are selected as sequential departure time routes. Among the transportation means Ca through Cc traveling on transportation line C, the combination of all transportation means subsequent to the time at which boarding is possible in a connecting node is searched on the basis of the time of arrival at the connecting node to transportation line C; the time required for each route, the number of transfer connections, and other information is added together; and guidance is provided.

The route search server 30 searches a plurality of candidate routes from the departure point to the destination point in accordance with route search conditions with reference to such network data, and the results are transmitted to the mobile terminal device 20 as the guidance route data. When the departure time from the departure point is specified in the route search conditions, the arrival time at the destination point is included in the guidance route data, and when the arrival time at the destination point has been specified, the departure time from the departure point in order to arrive at the specified time at the destination point is included in the guidance route data. The mobile terminal device 20 can display such information together with the route in the display means 26. When a transfer station is included in the guidance route, the train that is to be boarded at the transfer station and the departure point thereof can be displayed in the same manner.

Figure 9:
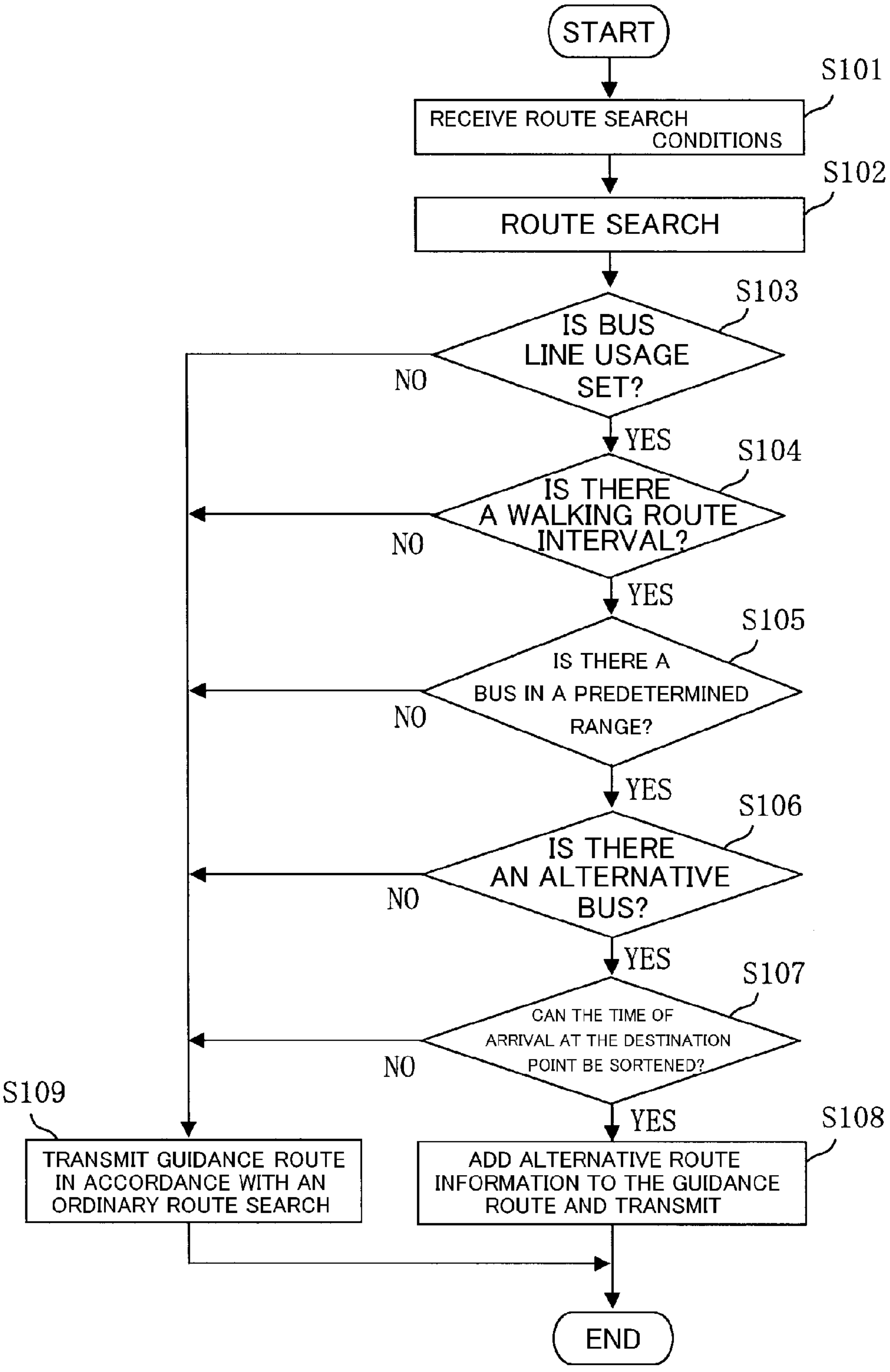
FIG. 9 is a flowchart showing the operation procedure in a route search server of the examples of the present invention.

The following description is based on the flowchart shown in FIG. 9, which shows the operation procedure in a route search server of the examples of the present invention. In step S101, route search server 30 receives the route search conditions from the mobile terminal device 20. Next, the route search means 39 searches (step S102) for a candidate route with reference to the route search network database 35 in accordance with the route search conditions received from the mobile terminal device 20.

The candidate route data obtained as a result of the route search is transmitted to the mobile terminal device 20. The mobile terminal device 20 displays the candidate route received from the route search server 30 in the display means 26 as shown in FIG. 4. When the user of the mobile terminal device 20 selects a candidate route in the display screen and transmits the route guidance request to the route search server 30, it is determined in step S103 whether the bus line usage setting has been set in the route search conditions. When the use of a bus line is set in the original route search conditions, the route search means 39 does not perform an alternative route search, and transmits the guidance route and map data to the mobile terminal device 20 in accordance with an ordinary route search (step S109).

Next, the route search means 39 determines in step S104 whether a walking route interval is present in the guidance route (the candidate route selected in the display screen of FIG. 4) selected in the mobile terminal device 20. When a walking route interval is not present, the route search means 39 does not perform an alternative route search and transmits the guidance route and the map data obtained in an ordinary route search to the mobile terminal device 20 (step S109).

When a walking route interval is present, the process proceeds to step S105 and it is determined whether there is a bus line on the current movement route on the basis of the current position of the mobile terminal device 20. If a bus line is available, a search is made for a bus stop in a predetermined range in the forward direction of movement of the mobile terminal device 20. If a bus line and a bus stop are not available, the route search means 39 does not perform an alternative route search, and transmits the guidance route and the map data obtained in an ordinary route search to the mobile terminal device 20 (step S109).

When a bus line and a bus stop are available, the route search means 39 references the operation service information database 36 and determines whether an alternative bus is available (step S106). This determination can be made in the following manner. Specifically, the time to arrival and the time of arrival at the bus stop is predicted on the basis of the position and passage time of the bus moving toward the bus stop in question. Next, the route search means 39 compares the estimated time of arrival of the bus and the estimated time of arrival of the user of the mobile terminal device 20 at the bus stop by walking, and determines whether the bus can be boarded.

In the case that a bus cannot be boarded, the route search means 39 does not perform an alternative route search, and transmits the guidance route and the map data obtained in an ordinary route search to the mobile terminal device 20 (step S109). When a bus can be boarded, a route search for an alternative route that uses a bus is performed, the time of arrival at the destination point, the fare, the number of transfers, and the like is calculated to the destination point, and the result is sent to the alternative route guiding means 33.

Next, the alternative route guiding means 33 in the step S107 compares the alternative route data obtained from the route search means 39 and the guidance route data of the route guidance requested by the user of the mobile terminal device 20, and determines whether the alternative route is a more advantageous route than the guidance route. For example, the alternative route is determined to be more advantageous than the guidance route when the time of arrival at the destination point in the alternative route is earlier than the time of arrival in the guidance route.

In the determination processing of step S107, comparison items based on the route search conditions at the time of the route search are used. Specifically, the alternative route is determined to be more advantageous than the guidance route also when the number of transfers in the alternative route is less than the number of transfers in the guidance route. Similarly, the alternative route is determined to be more advantageous than the guidance route also when the fare in the alternative route is less than the fare in the guidance route.

In the route search conditions shown in FIG. 3, sorting by the "shortest required time" is specified, and the alternative route is determined to be more advantageous than the guidance route when the time of arrival at the destination point in the alternative route is earlier than the time of arrival in the guidance route. The process in step S107 of FIG. 9 shows this state. The process proceeds to step S109 when it has been determined that the alternative route is not a more advantageous route than the guidance route.

In the case that the alternative route guiding means 33 has determined the that alternative route is more advantageous than the guidance route, the process proceeds to step S108, and the route search server 30 transmits the alternative route information that provides notification of the availability of an alternative route to the mobile terminal device 20. The alternative route information may be, as described above, "A bus bound for ZZ will arrive in two minutes at the SS bus station 10 meters ahead. You can shorten the time to your destination point by 10 minutes by taking this bus." Such a notification is content for notifying the user of the mobile terminal device 20 of the availability of an alternative route.

As described above in detail, in accordance with the navigation system of the present invention, an alternative route that uses a bus is searched based on real time operation service information obtained from a bus operating on a bus line in the case the a route search has been made that includes a walking route, and notification of such is provided when an alternative route is available that uses a bus and is more advantageous than a searched guidance route. Therefore, the user of the mobile terminal device 20 can select a movement method that uses a bus while the user of the mobile terminal device is moving by walking.

The invention claimed is:

1. A navigation system, comprising:

a route search server including a route searcher for referring to route search network data on a basis of a route search request that includes a departure location and a destination point and for searching for a guidance route that includes a route that makes use of transportation facilities; and a mobile terminal device including a display for displaying the guidance route searched by said route searcher and a GPS receiver for detecting a current position, wherein said route search server has an operation service information database in which the current position of each bus operating on a bus line is acquired and stored, and an alternative route searcher for evaluating and providing guidance for an alternative route that uses a bus, and wherein in the case that a walking route interval is included in said guidance route, said route searcher refers to said operation service information database on the basis of the current position of said mobile terminal device, and searches for an alternative route that substitutes for said walking route interval by specifying a bus that a user of said mobile terminal device can board; and said alternative route searcher compares route data of said alternative route and said guidance route, transmits alternative route information that shows the presence of an alternative route to said mobile terminal device in the case that an alternative route is a more advantageous route than the guidance route, and displays the guidance route on said display to provide notification of the alternative route.

2. The navigation system according to claim 1, wherein said route searcher searches for a bus stop in a predetermined range of a mobile terminal device on the basis of the current position of the mobile terminal device when a search is made for said alternative route, refers to said operation service information database, specifies a bus that a user of said mobile terminal device can board, and searches for said alternative route.

3. The navigation system according to claim 1, wherein said alternative route searcher compares the route data of said guidance route and said alternative route and determines whether the alternative route is more advantageous than the guidance route in relation to any one among a time of arrival at a destination point, a route fare, and a number of transfers.

4. The navigation system according to claim 1, wherein said navigation system does not provide guidance about the availability of said alternative route in the case that a bus riding distance in said alternative route is less than a predetermined distance.

5. The navigation system according to claim 1, wherein said navigation system does not provide guidance about the availability of said alternative route in the case that said mobile terminal device is not in a walking route interval or in the case that a route search that includes a bus line is set to be a route search condition.

6. The navigation system according to claim 1, wherein said navigation system references said operation service information database, calculates a scheduled time until said bus specified for the user of said mobile terminal device arrives at the next scheduled bus stop, and does not provide guidance about the availability of said alternative route in the case that the scheduled time is less than a predetermined time.

7. A route search server, comprising:

a route searcher for connecting via a network to a mobile terminal device having a display for displaying a guidance route and a GPS receiver for detecting the current position, referring to a route search network data on the basis of a route search request that includes a departure point and a destination point, and searching for a guidance route that includes the use of transportation facilities, wherein said route search server has an operation service information database for acquiring and storing the current position of each bus operating along a bus line, and an alternative route guider for evaluating and providing guidance along an alternative route that uses a bus, and wherein in the case that a walking route interval is included in said guidance route, said route searcher refers to said operation service information database on the basis of the current position of said mobile terminal device, specifies a bus that can be boarded by the user of said mobile terminal device, and searches for an alternative route for substituting said walking route interval; and said alternative route guider compares the route data of said alternative route and said guidance route, transmits the alternative route information indicating the availability of an alternative route to said mobile terminal device in the case that the alternative route is a more advantageous route than the guidance route, displays the guidance route on said display, and provides guidance about the availability of an alternative route.

8. The route search server according to claim 7, wherein said route searcher searches for a bus stop in a predetermined range of the mobile terminal device on the basis of the current position of the mobile terminal device when a search is made for said alternative route, refers to said operation service information database, specifies a bus that a user of said mobile terminal device can board, and searches for said alternative route.

9. The route search server according to claim 7, wherein said alternative route guider compares the route data of said guidance route and said alternative route and determines whether the alternative route is more advantageous than the guidance route in relation to any one among a time of arrival at a destination point, a route fare, and a number of transfers.

10. The route search server according to claim 7, wherein said route search server does not provide guidance about the availability of said alternative route in the case that the bus riding distance in said alternative route is less than a predetermined distance.

11. The route search server according to claim 7, wherein said route search server does not provide guidance about the availability of said alternative route in the case that said mobile terminal device is not in a walking route interval or in the case that a route search that includes a bus line is set to be a route search condition.

12. The route search server according to claim 7, wherein said route search server references said operation service information database, calculates the scheduled time until said bus specified for the user of said mobile terminal device arrives at the next scheduled bus stop, and does not provide guidance about the availability of said alternative route in the case that the scheduled time is less than a predetermined time.

13. A mobile terminal device that connects via a network to a route search server provided with route searcher for referring to route search network data on the basis of a route search request that includes a departure location and a destination point and searching for a guidance route that includes a route that makes use of transportation facilities, and comprises a display for displaying a guidance route searched by said route searcher and a GPS receiver for detecting the current position, wherein said route search server has an operation service information database for acquiring and storing the current position of each bus operating along a bus line, and alternative route guider for evaluating and providing guidance along an alternative route that uses a bus, wherein said route searcher, in the case that a walking route interval is included in said guidance route, refers to said operation service information database on the basis of the current position of said mobile terminal device, specifies a bus that can be boarded by the user of said mobile terminal device, and searches for an alternative route for substituting said walking route interval;

said alternative route guider compares the route data of said alternative route and said guidance route, and transmits the alternative route information indicating the availability of an alternative route to said mobile terminal device in the case that the alternative route is a more advantageous route than the guidance route; and said mobile terminal device displays the guidance route on said display means and provides guidance about the availability of an alternative route.

14. A route guidance method in a route search server having a route searcher for connecting via a network to a mobile terminal device having a display for displaying a guidance route and a GPS receiver for detecting the current position, referring to a route search network data on the basis of a route search request that includes a departure point and a destination point, and searching for a guidance route that includes the use of transportation facilities, wherein said route search server has an operation service information database for acquiring and storing the current position of each bus operating along a bus line, and an alternative route guider for evaluating and providing guidance along an alternative route that uses a bus, the route guidance method comprising:

a step in which, in the case that a walking route interval is included in said guidance route, said route searcher refers to said operation service information database on the basis of the current position of said mobile terminal device, specifies a bus that can be boarded by the user of said mobile terminal device, and searches for an alternative route for substituting said walking route interval; and a step in which said alternative route guider compares the route data of said alternative route and said guidance route, and transmits the alternative route information indicating the availability of an alternative route to said mobile terminal device in the case that the alternative route is a more advantageous route than the guidance route.

* * * * *